Oct. 29, 1968     T. A. SZYMANSKI     3,408,083
INFLATABLE SEAL
Filed Sept. 2, 1966     2 Sheets-Sheet 1
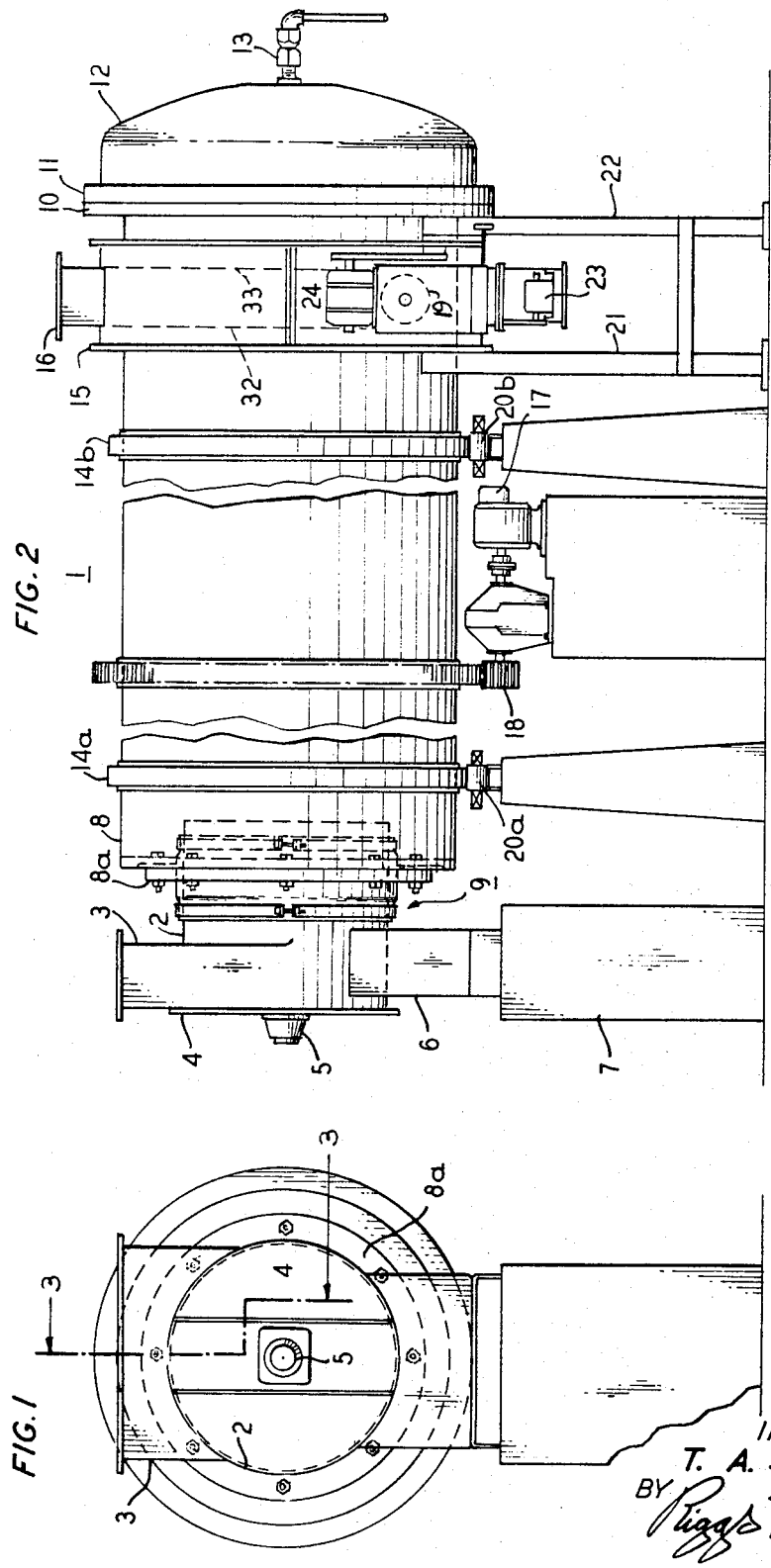
INVENTOR
T. A. SZYMANSKI
BY Riggs T. Stewart
ATTORNEY Oct. 29, 1968    T. A. SZYMANSKI    3,408,083
INFLATABLE SEAL
Filed Sept. 2, 1966    2 Sheets-Sheet 2
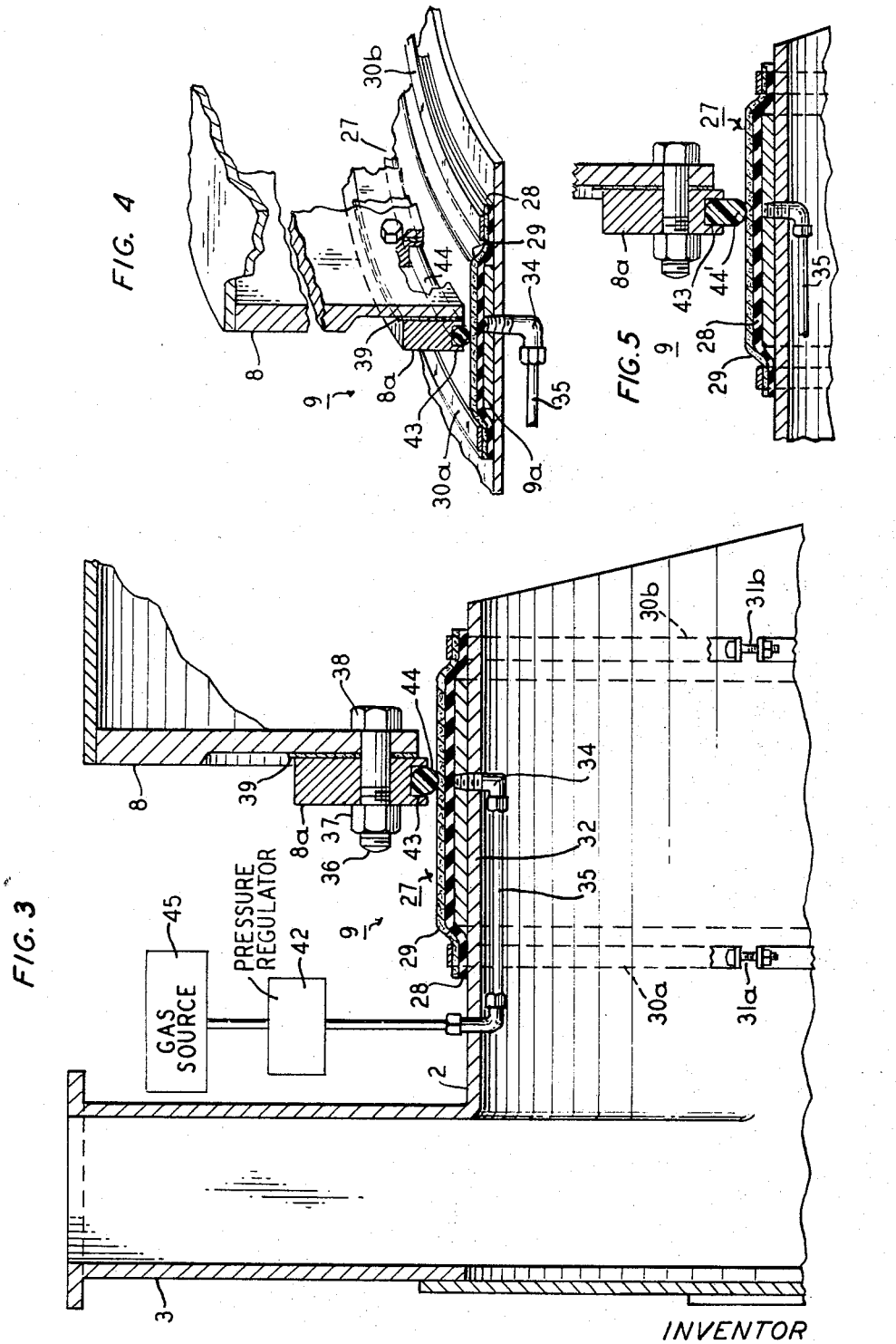
INVENTOR
T. A. SZYMANSKI
BY
Riggs T. Stewart
ATTORNEY

United States Patent Office 3,408,083
Patented Oct. 29, 1968

3,408,083
INFLATABLE SEAL
Thaddeus A. Szymanski, Gilbertsville, Ky., assignor, by mesne assignments, to Air Reduction Company, Incorporated, New York, N.Y., a corporation of New York
Filed Sept. 2, 1966, Ser. No. 576,935
8 Claims. (Cl. 277—34)

ABSTRACT OF THE DISCLOSURE

A seal between relatively rotatable members is formed from an annular sealing ring which is carried by one of the rotatable members and a composite band disposed opposite the sealing ring and carried by the second rotatable member, the composite band comprising an outer web formed from a material having a low co-efficient of friction and an inner inflatable web formed from an elastomeric material defining a fluid type chamber with the surface of the second rotatable member, means being provided for maintaining a positive fluid pressure in the chamber to cause inflation of the composite band.

---

This invention relates in general to fluid-tight seals for relatively movable members; and more particularly to pneumatic sealing means disposed between fixed and rotatable members in industrial processing equipment.

In present day use are many mechanisms in which one member moves relatively to the surface of another with a rotating or reciprocating motion. These include, for example, many types of moving vehicles, conveyors, and industrial processing machinery, such as drills, pumps, agitators, dryers, separators, and the like. In many cases it is necessary or desirable to prevent leakage at the juncture between a fixed and a moving part, or two relatively moving parts, by means of an interposed seal.

A typical example of a device to which such a seal is applicable is a steam-tube industrial dryer e.g. of the type used for drying polyvinyl alcohol. Such a dryer comprises a fixed pipe serving as the feed inlet throat, which is enclosed concentrically in one end of a shell, including drying means, which is rotated during the drying operation. The dried product leaves the dryer at a stationary outlet hood or collector which, in a typical embodiment, encloses the rotating shell concentrically near its other end. A type of prior art seal disposed between the fixed and the rotating portions of such a dryer has comprised a plurality of segmented rings of a laminated resinous textile product, which were held together by means of garter springs at the periphery and coil springs at the sides, in such a manner that they bore against the polished cylindrical surface of the rotating shell.

Although such an arrangement was supposedly designed to compensate for lack of concentricity between the rotating shell and the stationary elements, it was found not to be altogether effective for this purpose. Since the polyvinyl alcohol feed to the dryer contains a substantial proportion of solid fines as well as liquid solvent, the slightest gap between the segments of the sealing device and the polished surfaces against which they bore allowed escape of the solid fines and liquid solvent out of the dryer shell into the atmosphere. This condition obtained, notwithstanding the fact that a controlled pressure differential was maintained between the stationary hoods and the rotating dryer shell. This was believed to be caused by compressibility of the feed at the sealing surfaces, resulting in liquid leakages through the seal interfaces because of alternate filling and compression at intervening seal gaps. In fact, it has been found that gaps as small as 0.010 to 0.020 of an inch between the fixed and rotating members can cause seal failure. Moreover, action of the rotating shell on the solid portion of the feed has been found to generate extrusion pressures which result in bending and breaking of the segments at both inner and outer seals in the dryer, with considerable vapor and some solid loss.

Accordingly, it is the general object of the present invention to provide an improved fluid-tight seal adapted for use between relatively movable members.

A more particular object of the invention is to provide a seal adapted for use between fixed and rotatable members which compensates more completely for surface irregularities and lack of concentricity between the contacting surfaces, than available prior art seals, thereby minimizing the gaps to which the seal is subject.

Another object of the invention is to provide a seal for use between relatively movable members in which the contact friction along the line of the seal is substantially reduced without reducing the effectiveness of the seal in closing the gaps between the contacting surfaces.

Still another object of the invention is to provide a seal with fewer components than prior art seals, which is simpler and less expensive to fabricate and install, and more durable.

These and other objects are realized in a seal in accordance with the present invention, adapted to be interposed between a pair of relatively moving members, wherein a ring of smooth flexible plastic, which is secured to one surface, bears against a pneumatically inflated belt secured to the second surface, which belt comprises a composite of an underlayer of elastomer, and an overlayer of a sheet or web fabricated from the same, or similar, smooth flexible plastic as the rod.

In the illustrative example to be described, the seal of the present invention is employed in an industrial steam-tube dryer for polyvinyl alcohol, between a stationary feed inlet throat whose end is concentrically enclosed in a rotating dryer shelf, and also between the latter and a stationary outlet hood, at which the product leaves the dryer near the end of the rotating shelf opposite the inlet end. At the inlet end, the described embodiment comprises a seal retainer ring which is secured, as by bolting, to the rotating dryer shell, the retainer ring having an annular notch or recess into which is pressed a solid ring of polymerized tetrafluoroethylene, e.g. the polymer known by the trade-name "Teflon". The latter rides over or bears against an inflatable composite belt which surrounds the cylindrical surface of the stationary feed throat in the area of the seal, the edges of the composite belt being secured to the cylindrical surface of the feed throat, as by a pair of steel bands. The composite belt comprises an underlayer of neoprene or similar elastomer, which is overlain by an overlayer of a sheet or web formed of polymerized tetrafluoroethylene (Teflon). The annular diaphragm created by the composite belt is adapted to be inflated, or expanded slightly, as with an inert gas, such as nitrogen, but a few pounds pressure. It has been found that after running for a very short period, the area of the tetrafluoroethylene web which is in contact with the Teflon ring develops a film-like appearance and any gaps between the surfaces are substantially filled, making an extremely smooth, low friction contact.

It is a feature of the invention that the component parts of the seal are free from complex elements, are assembled with ease, and are inexpensive to fabricate and apply. Still another feature of the seal of the present invention is its durability, in that the component parts operate successfully for long periods without requiring replacement.

These and other objects, features, and advantages of the invention will be apparent to those skilled in the art from a detailed study of the present specification taken with reference to the accompanying drawings, in which:

FIGURE 1 is an end-elevation of a typical industrial dryer having stationary and rotatable members, to which may be applied the seal of the present invention;

FIGURE 2 is a side elevational showing of the industrial dryer of FIGURE 1, in which seals in accordance with the present invention are indicated at the inlet and outlet ends thereof;

FIGURE 3 is a detailed cross-sectional showing of the seal at the inlet end of the dryer shown in FIGURES 1 and 2;

FIGURE 4 is a detailed perspective showing of the seal illustrated in FIGURE 3; and FIGURE 5 shows a modified form of the plastic right seen in FIGURES 3 and 4.

Although, as pointed out previously, the seal of the present invention is useful in many different types of mechanical systems which involve relatively movable parts, it will be described, for purposes of ease of illustration, as applied to an industrial dryer 1 of a type used for drying polyvinyl alcohol, such as illustrated in end elevation and side elevation in FIGURES 1 and 2, respectively. Since the invention is concerned with a seal and is not directed to a dryer per se, the construction of the dryer is shown in the drawings for illustrative purposes only, and in somewhat diagrammatic form, and is not intended to include every detail of a commercial dryer. A typical dryer of the type for which the seal of this invention is particularly suited is illustrated, for example, in Neubauer et al., U.S. 2,760,791 of Aug. 28, 1956, in connection with a typical seal construction of a type heretofore proposed.

In the following description of an illustrative embodiment of the seal of this invention as applied to the dryer 1, reference will be made to specific typical dimensions, both with respect to the dryer and with respect to the seal, in order to provide a better understanding of the invention in a practical commercial installation. It will be understood, however, that these dimensions are for illustrative purposes only and are in no way limitative of the invention, which may be embodied in constructions of a wide range of dimensions.

Referring to the drawings, the dryer 1 to which the seal of the invention is applied is illustrated as comprising a feed inlet throat 2 which is defined by a cylinder, e.g. of steel, from which the feed pipe opening 3 projects vertically above the top of the cylinder. The outer end of cylindrical feed inlet throat 2 is closed by a flat disk 4, welded or otherwise secured in gas-tight relation, the center of which has a bearing 5 for a feed ribbon conveyor, driven by an internal spider in the dryer shell, which arrangement has not been shown, as it comprises conventional means. Inlet throat 2, which is stationary, rests in a yoke 6 which is supported on a pedestal. In a typical operation, the polyvinyl alcohol feed to the dryer 1 comprises 35 to 50 percent solids, depending on the grade, the remainder being chiefly methanol with lesser amounts of methyl acetate and water. In this state, the feed, which is quite compressible, is fed into the cylindrical feed inlet throat 2 through feed pipe opening 3.

Concentric with the stationary throat 2, and having a flanged end overlapping the end of the throat 2, is a rotatable cylindrical shell 8, e.g. of stainless steel flanged and of the rotating shell 8 and the stationary cylindrical outer surface of feed throat 2 is interposed a seal 9 having the construction of the present invention, which will be described in detail hereinafter with particular reference to FIGURES 3 and 4 of the drawings.

Rotatable shell 8 terminates at its other end in a flange 10, to which is welded, or otherwise secured in a gas-tight fashion, a matching flange 11 of a hemispherical steel closure 12, e.g. of stainless steel. A steam inlet 13, which protrudes from the center of closure 12, leads to a plurality of steam dryer pipes (not shown) which are disposed inside of and run the length of the shell 8.

Surrounding the rotatable shell 8, and centered to the left of the inner face of flange 10, at the outlet end of the dryer, is an anular hood 15 which protrudes above the surface of the rotatable shell 8. Integral with and protruding vertically upwardly from the annular hood 15, which remains stationary during the rotation of the shell 8, is a stack 16. The top of stack 16 protrudes in a radial direction from the center of rotatable shell 8.

The shell 8 is, in a typical operation, rotated at a rate of between 2 and 4 revolutions per minute by a conventional driving means comprising a motor with variable speed drive 17, and pinion gear system 18, which causes tires 14a, 14b girding the shell to rotate in respective supporting bearings 20a, 20b.

The metal framework comprising vertical members 21 and 22, supports a conventional screw conveyor, one end of which is represented by 19, and which is driven by the motor 24. Element 23 functions as the dryer solids discharge airlock.

The solids outlet chamber within hood 15, which communicates with the interior of shell 8 by means of a series of circumferentially-spaced apertures in the shell wall (not shown), and into which recycle gas enters countercurrently through stack 16, is sealed off from the remaining portions of the dryer by means of a pair of seals 32 and 33, which are constructed in accordance with the teachings of the present invention. The position of these seals beneath hood 15 is indicated by the dotted lines in FIGURE 2. The seals 32 and 33 are substantially similar in form to seal 9, which will now be described in detail with reference to FIGURES 3 and 4, which are enlarged cross-sectional and perspective views, respectively, showing the seal 9. The seal 9, in the embodiment illustrated, is most suitably applied on top of a steel band 9a which is secured, as by welding, around the circumference of the outer surface of the feed throat 2, and machined so that it is concentrically true. The seal 9 comprises a composite annular band 27 which surrounds the steel band 9a on the stationary feed throat 2, the outer edge of the composite band 27 being suitably spaced from the outer edge of feed throat 2. In the embodiment illustrated, band 27 comprises an annular strip of neoprene (polychloroprene) 28 which is integrally formed or which is butt vulcanized prior to being placed in position on the cylindrical surface of feed throat 2, or which is butt vulcanized after being applied. However, it will be understood that, for the purposes of the present invention, any elastomer can be used which is compatible with the chemical content and environmental requirements of the dryer, or other equipment on which the seal is employed. The seal is constructed so that only a relatively small inflation or expansion is required to insure continued, effective contact between the components of the seal, so that the main requirement of the elastomer strip is that it be relatively non-porous to gas and that it be capable of at least a small degree of elongation, e.g. up to about 3%, at the pressure of the inflating medium which is advantageously at a gauge pressure of about 50 to 75 inches of water. In the present example, neoprene is preferred for the seal 9 at the feed end of the dryer at which the maximum temperature is generally of the order of 180°, whereas butyl rubber (GR–1) is preferred for the seals 32 and 33 at the discharge end of the dryer at which the maximum temperature is generally of the order of 250° F.

The band of elastomer 28 is cemented to the surface of the feed throat 2 along its circumference for a short distance, e.g. a width of one inch along both edges, on both sides of the metal band 9a. For this purpose any of the conventional metal-to-elastomer sealants may be used which are compatible with the environmental requirements of the system.

Around the elastomer band 28 is placed a matching strip 29, comprising a layer of a sheet or web of, for example, tetrafluoroethylene (Teflon). The latter can be obtained commercially from Modern Plastics of Dayton, Ohio, under the catalog designation Armalon TFE Teflon Felt. Alternatively, for this purpose sheets or web of other materials, such as nylon, can be employed, the principal requirement being that they be synthetic plastic materials which exhibit a high flexibility and a low coefficient of friction in contact with a layer of similar material.

The tetrafluoroethylene layer is advantageously butt joined at its ends to encircle the elastomer band by cutting the ends in matching steps which are fitted together with any convenient adhesive. The cement can be applied into the stepped interface between the two ends, and pressed until dry at ambient temperature. Alternatively, an integrally formed continuous annular strip of the sheet may be used which is dimensioned to encircle the elastomer strip snugly.

After the composite belt 27 has been placed on the throat 2, the two ends are secured to the throat 2, e.g. by means of a pair of steel bands 30a, 30b. The latter are preferably formed of stainless steel and are each placed a short distance from a respective edge of the band 27 and tightened into place.

This provides a gas-tight annular chamber, into which is screwed a conventional elbow fitting 34, which penetrates an opening through the cylindrical shell 2, into which it is sealed with a gas-tight seal. The inner end of elbow 34, inside of the cylindrical shell 2, is connected to a flexible hose 35, e.g. of one-quarter inch internal diameter. The latter is formed of any metal or plastic material, such as polyethylene, which is inert to the chemical or other material processed in the dryer or other device with which the seal is used. Hose 35 passes in a gas-tight connection through the shell 2.

The inflation valve is connected through the pressure regulator 42 to a source 45 of gas available for inflation. In the embodiment under description, in which the dryer contains potentially explosive components, an inert gas is employed for inflation. This gas suitably is nitrogen, when may be mixed with other inert gases, such as argon, etc. However, in other embodiments, where there is no danger of chemical involvement, air can be used. In the present embodiment, the inert gas line pressure is maintained at 15–17 pounds per square inch gauge. The diaphragm formed by composite belt 27 is inflated with about 0.3 cubic foot of inert gas, at ambient temperature, and is maintained at a gauge pressure of about 50 inches of water by regulator 42, during operation of seal 9.

The element 8a fastened to the end surface of the rotating dryer shell 8, in the area of contact with the surface of feed throat 2, takes the form of a retainer ring, e.g. of mild carbon steel, of rectangular cross-section An annular notch 43, is formed in the inside surface of retainer ring 8a. Into notch 43 is pressed a solid ring 44. The latter is formed from a rod which is pressed into the retainer ring notch 43 and cut off precisely as the full circle is reached. In a preferred embodiment the ring 44 is formed of tetrafluoroethylene (Teflon). However, it is contemplated, in accordance with the present invention, that other materials having a high degree of flexibility and relatively low contact friction, such as, for example, nylon, can be used.

FIGURE 5 of the drawings shows a modification of the invention in which the ring 44 is formed of a rod of tetrafluoroethylene which is filed until the vertical sides are parallel in the plane of the drawing, fitting snugly into the notch 43.

The retainer ring 8a is fixed to the lower outer surface of shell 8 e.g. by means of a plurality of bolts 36. In the embodiment of the present invention, these number twelve, and are symmetrically spaced around the circumference of retainer ring 8a. Bolts 36 are fixed in position by means of hexagonal nuts 37. The retainer ring 8a fits into the edge surface of the shell 8 in a slight recess, e.g. one-quarter inch, machined in the latter, so that the ring rests against an asbestos gasket 39.

The retainer ring 8a and the polyfluoroethylene contactor ring 44 are so adjusted that the ring 44 bears on the outer surface of the composite band 27 near its center. When the two parts of the seal are first installed, the surface of ring 44 and band or strip 29 are suitably just touching, or just slightly out of contact. The desired sealing, sliding engagement is achieved by reason of the slight inflation of the assembly 27 under the action of gas or liquid pressure. The ring 8a can be continuous or can be formed in segments for ease of assembly.

After the shell 8 has been rotated for a short period, it has been found that the surface of the composite band 27 becomes filled, causing the contact surfaces to become extremely slick and to exhibit a very low coefficient of friction, resulting in a film-like appearance.

While the composite belt 27 at the inlet end of the dryer as above described is thus inflated by a constant gas pressure maintained by a pressure regulator, it will be understood that, in practice, the adhesive sealing of the annular strip 28 to the metal portion of the apparatus effectively provides a fluid-tight chamber from which leakage of gas will occur at a very slow rate, if at all. Consequently, when such a situation exists, the gas source and the pressure regulator can be eliminated from continuous connection with the system and, by fitting the line 35 with a conventional tire inflation valve, the chamber can be intermittently fed from a source with gas at substantial intervals to compensate for any such slight leakage. In this case, an external pressure recorder can be provided in the line 35 to indicate the pressure at any given moment. This system is particularly adapted for use with the seals 32 and 33 at the outlet end of the device, these seals having the same structure as that described for seal 9, wherein the elements 8a and 44 are carried by the side flanges of the hood 15 and wherein the elements 28, 29, 30a and 30b are carried by the rotatable shell 8 of the dryer, the elements 28 and 29 suitably being mounted over a metal ring corresponding to the ring 9a shown in FIG. 4, which can be mounted upon the shell under each side wall of the hood. In that construction wherein the composite belt is mounted on the rotating member, continuously feeding air to the seal involves the use of a swivel or rotatable gas line connection along the rotation axis of the shell 8. It is thus advantageous to have the line 33 lead from each composite belt chamber to the exterior of the shell 8 and to be provided with an inflation valve of the tire valve type and a pressure recorder for inflation at intervals to make up for any pressure loss which may occur. Alternatively, the system illustrated in FIGURE 3 can be used with the gas source in the form of a gas cylinder strapped or otherwise secured to the surface of the rotatable shell for continuous simultaneous movement with the shell. It is apparent, therefore, that either of the two components of this invention can be mounted on the stationary or the rotatable member upon which the seal is disposed with substantially equal facility.

In a typical dryer such as described above, the cylinder defined inlet throat 2 may be about three feet in diameter and twenty-five inches in axial length, with the feed pipe opening 3 being one foot wide and three feet long. The shell 8 may overlap the end of the throat 2 to an axial depth of three inches and may have an outer diameter of five feet at an axial length of thirty feet. Hood 15 may be centered about a foot to the left of the interface flange 10 and have a width of eighteen inches, and protrude about six inches above the surface of shell 8.

In a typical embodiment of the seal of this invention, as applied to a rotary dryer of the type described, the band 9a is conveniently ¼" thick and 4" wide and the composite annular band 27 is spaced 18" from the outer edge of feed throat 2. In this construction, the neoprene strip 28 is conveniently 6" wide and of sufficient circumference to encircle band 27. The strip 28 is advantageously cemented to the surface of feed throat 2 for a width of about one inch along both edges. The strip 29 can be about ⅛" thick and have a sufficient circumference to overlie the strip 28. The steel bands 30a and 30b may each be ½" wide and are suitably placed ½" from a respective edge of band 27. The bands 30a and 30b are suitably tightened by bolts 31a and 31b, respectively. In the pressure supply system, the hose 27 can be ¼" in diameter.

In the present application to an industrial dryer for polyvinyl alcohol, a seal in accordance with the present invention has lasted six and one-half months in continuous service, seven days a week, 24 hours a day, with negligible loss of methanol vapor and solid.

As has been previously indicated, various changes can be made in the embodiment illustrated without departing from the scope of the invention as defined in the appended claim. For example, the seal construction is applicable to various other devices in which a fluid-tight seal between a stationary and a rotating member is desired, e.g. in pumps, drills, other heating exchange devices, and the like. The inflating medium can be any gas, or even a liquid, so long as it is compatible with the material being passed through the device. In the embodiment illustrated, involving a dryer for polyvinyl alcohol, nitrogen rather than air is used as the inflating medium since contact between air and the polyvinyl alcohol being dried is undesired should any leakage of the inflating medium occur. As described, the band or strip 28 is adhesively secured along its edges to the surface upon which it is mounted. The band or strip 29 can also advantageously be adhesively secured along its edges to the band 28, and an adhesive can be applied between the elements. As previously mentioned, the dimensions recited are merely for ease of illustrating a preferred embodiment of the invention and are not to be regarded as limitative of the invention in any way. It will be understood, therefore, that all matter contained in the foregoing description and in the drawings is to be interposed as illustrative only and not as limiting the invention.

I claim:

1. In a device comprising a member of circular cross-section, a shell enclosing a portion of said member concentrically, said member and said shell being designed for relative rotation about a common axis,
   a fluid-tight seal which follows a closed curvilinear path between adjacent areas on the outer surface of said member and the inner surface of said shell, said seal comprising:
   a rigid retainer ring including an inwardly directed annular slot secured to an inner edge of said shell adjacent the surface of said member,
   a flexible plastic contactor ring fitted into and gripped by the slot in said retainer ring,
   a composite band comprising an underlayer of an elastomer overlain by an overlayer comprising a web of a flexible plastic,
   means disposed on the top of said composite band near said edge portions for holding said edge portions in fluid-tight engagement with the surface of said member, thereby converting said composite band into an annular inflatable chamber above said member of circular cross-section and disposed beneath said contactor ring,
   and conduit means connected to said chamber and adapted to be connected to a source of inflating fluid.

2. The combination as defined in claim 1 wherein a metal band is secured to said member of circular cross-section along said curvilinear path and underlying said composite band.

3. The combination as defined in claim 1, wherein the coefficient of friction between said flexible plastic contactor ring and the overlayer of said composite band is substantially within the range of about 0.04 to 0.25.

4. The combination as defined in claim 1, wherein said flexible plastic contactor ring comprises primarily polymerized tetrafluoroethylene, and wherein the oversurface of said composite band in contact with said contactor ring comprises primarily a web formed of polymerized tetrafluoroethylene.

5. The combination as defined in claim 1, where said elastomer comprises primarily neoprene.

6. The combination as defined in claim 1, wherein said elastomer comprises primarily butyl rubber.

7. In a seal construction disposed between relatively rotating members, including a first member and a second member, annular retainer means secured to the first member, annular sealing ring means carried by said retainer means and facing said second member, an annular composite band secured to said second means and having an outer surface disposed in sliding engagement with said sealing ring means, said composite band comprising an outer web and an inner inflatable web, said composite being secured at its axially outer ends to said second member to define a fluid-tight chamber between the inflatable web and the surface of the second member, and means for maintaining a positive fluid pressure in said chamber.

8. A seal construction as defined in claim 7, wherein said outer web and said ring means are formed from polytetrafluoroethylene.

References Cited
UNITED STATES PATENTS

| | | | |
|---|---|---|---|
| 3,007,518 | 11/1961 | Simpson | 277—34 X |
| 3,152,703 | 10/1964 | Slagley | 277—34 X |
| 3,337,222 | 8/1967 | Smith et al. | 277—34.3 |

SAMUEL ROTHBERG, *Primary Examiner.*